United States Patent [19]

Hammer et al.

[11] 4,420,495

[45] Dec. 13, 1983

[54] METHOD AND APPARATUS FOR PREPARING FOAMY SAUCES OR THE LIKE

[75] Inventors: Josef Hammer, Freiburg i. Br.; Lothar Schiel, Waldkirch; Hans Kratt, Mannheim, all of Fed. Rep. of Germany

[73] Assignee: Grossküchenanlagen Ing. Josef Hammer, Freiburg i. Br., Fed. Rep. of Germany

[21] Appl. No.: 264,827

[22] Filed: May 18, 1981

[30] Foreign Application Priority Data

May 17, 1980 [DE]  Fed. Rep. of Germany ....... 3018956
Oct. 22, 1980 [DE]  Fed. Rep. of Germany ....... 3039797

[51] Int. Cl.³ .................... A23C 15/04; A23L 1/24; A23L 1/22
[52] U.S. Cl. .................... 426/564; 426/568; 426/589; 426/605; 426/565
[58] Field of Search ............... 426/589, 564, 605, 568, 426/565

[56] References Cited

U.S. PATENT DOCUMENTS

| | | | |
|---|---|---|---|
| 2,000,646 | 5/1935 | Rector | 426/605 |
| 2,357,896 | 9/1944 | Howe | 426/564 |
| 3,804,957 | 4/1974 | Purves | 426/605 |
| 3,935,323 | 1/1976 | Feminella et al. | 426/564 |
| 3,944,680 | 3/1976 | van Pelt et al. | 426/564 |
| 4,004,040 | 1/1977 | Puta | 426/564 |

*Primary Examiner*—Jeanette M. Hunter
*Attorney, Agent, or Firm*—Kontler, Grimes & Battersby

[57] ABSTRACT

Sauce hollandaise, sauce bearnaise or similar fancy sauces, dressings, batters or soups are prepared by maintaining a supply of mixture of ingredients including butter or margarine, flour, milk, wine, vinegar, spices, salt, egg yolks and/or others in a state of readiness at a temperature of less than 50° C., drawing by a pump a desired quantity of mixture from the supply and automatically mixing the withdrawn material with air in requisite quantities and simultaneously homogenizing the mixture of withdrawn material and air so that the ultimate product is of foamy consistency. Large quantities of prepared mixture can be stored in deep frozen condition, and batches of deep frozen mixture are defrosted as the need arises. The pump which draws mixture from the supply can be used to draw a stream of washing and/or rinsing liquid when the pump, its mixture supplying conduit and the homogenizing unit are to be cleaned.

17 Claims, 4 Drawing Figures

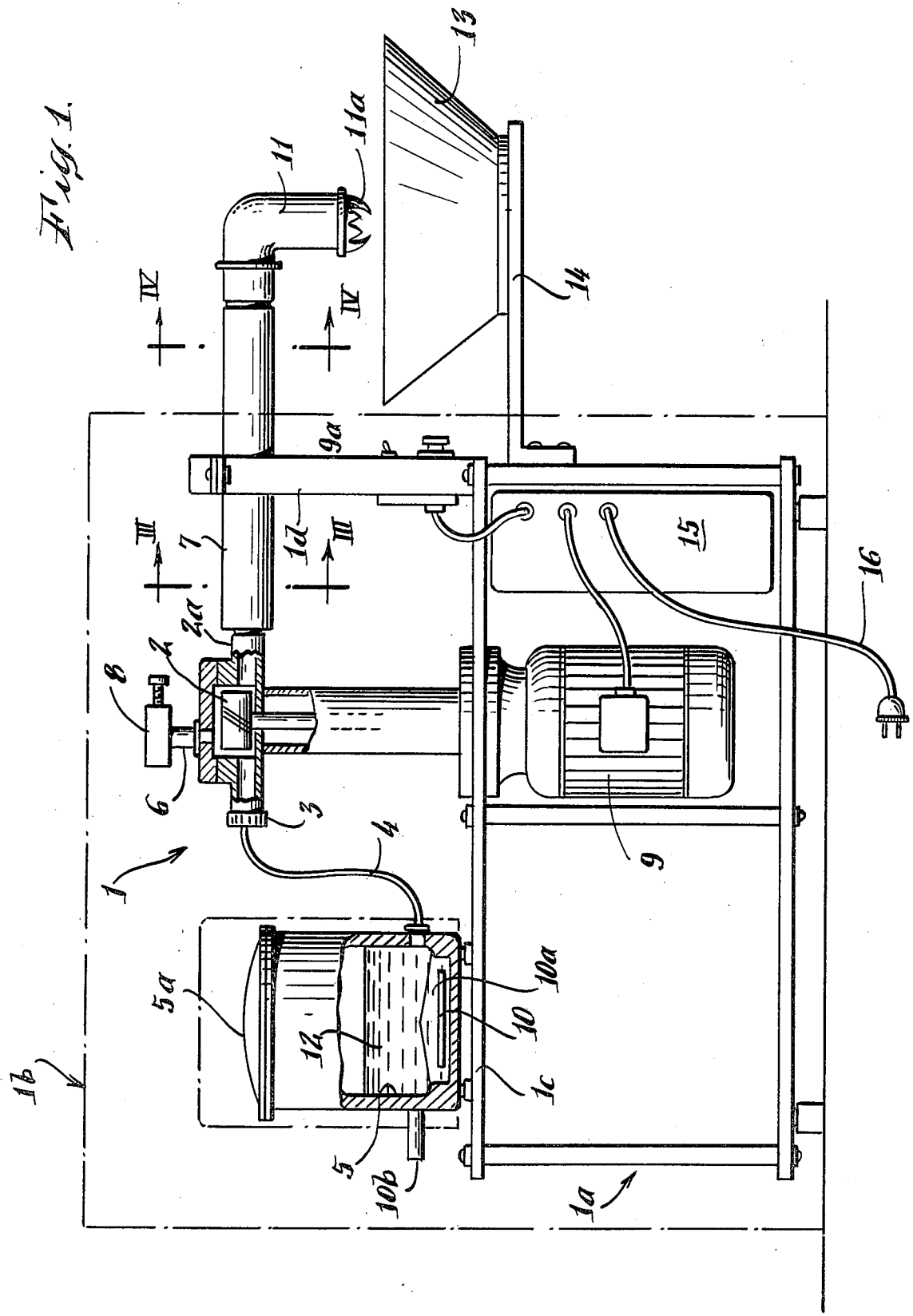

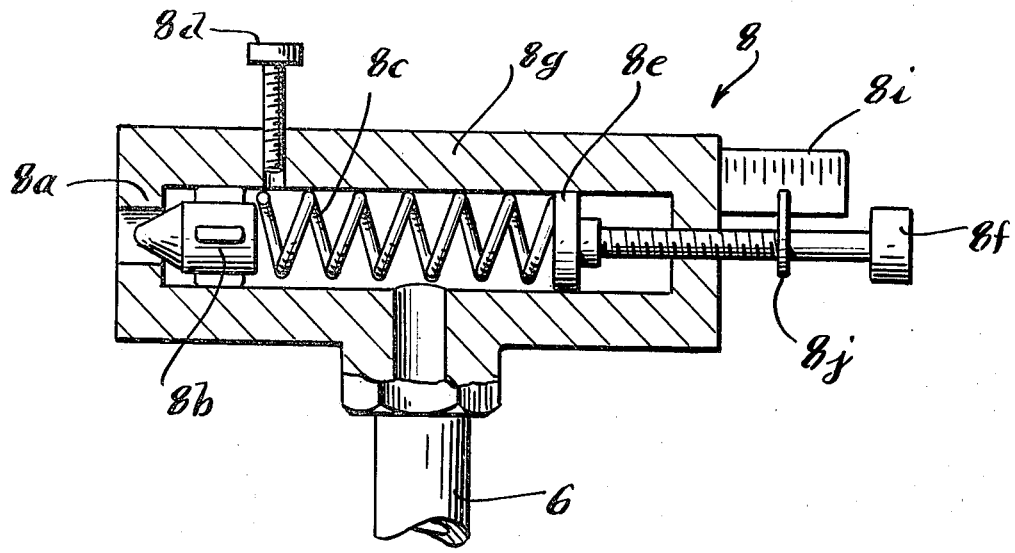
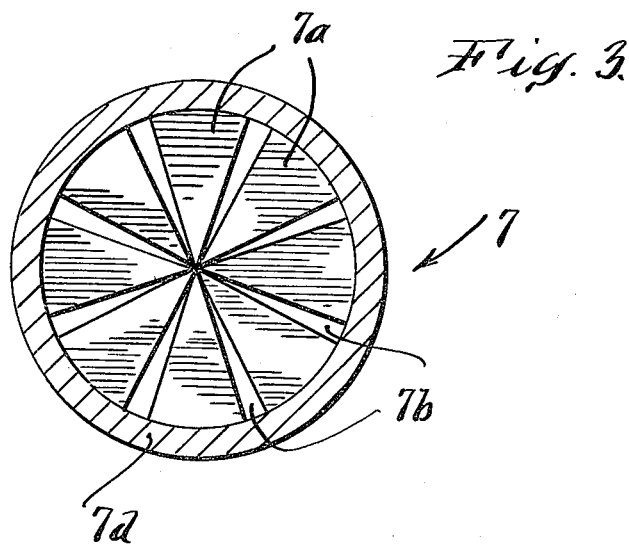
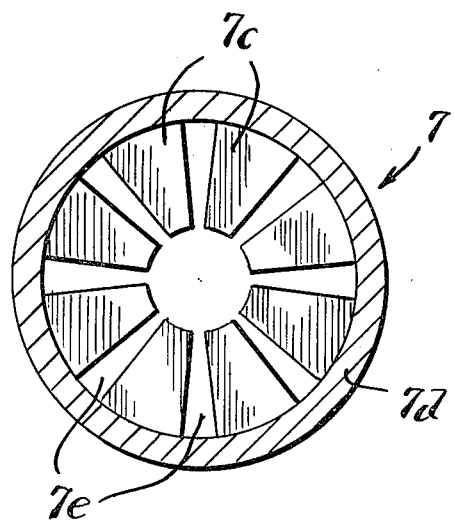

METHOD AND APPARATUS FOR PREPARING FOAMY SAUCES OR THE LIKE

BACKGROUND OF THE INVENTION

The present invention relates to a method and apparatus for preparing foamy foodstuffs, such as various batters, sauces, soups, creams, dressings and the like. More particularly, the invention relates to a method and apparatus for preparing foamy foodstuffs (such as sauce bearnaise or hollandaise) which normally contain butter or margarine as well as one or more additional ingredients including sugar, milk, heavy cream, vinegar, egg yolks, spices, wine and/or other alcoholic beverages, lemon juice and other seasonings.

The taste of many creamy sauces and analogous foodstuffs can be improved by foaming (i.e., by mixing with air) and/or homogenizing (i.e., intimate intermixing of the ingredients). Such foodstuffs include various types of cream soups, butter sauces (especially bearnaise and hollandaise), batters, creams, salad dressings and analogous preparations. In fact, certain types of foodstuffs are practically inedible in the absence of thorough mixing with air and/or homogenizing prior to serving. However, the cost of preparing such foodstuffs, especially on a relatively small scale (e.g., for individual guests in a restaurant) is very high so that many restaurants desist from serving foods with sauces, dressings, creams and like preparations whose making takes up much time and/or necessitates the presence of a highly skilled and trained person, i.e., a cook or chef with adequate experience in the preparation of fancy foodstuffs. For example, in order to constitute a culinary treat (both as to taste and appearance), each serving of sauce hollandaise or bearnaise must be beaten by hand so as to impart to the sauce a highly desirable foamy consistency at the time of placing the order before the paying guest in a quality restaurant or a like establishment. The cost of preparation of such fancy foods is high, not only because of the need for adequate mixing with air but also in view of the desirability for pronounced homogenization of all ingredients. If a restaurant continues to serve fancy butter sauces, such as hollandaise and bearnaise, it is necessary to maintain a supply of sauce in thoroughly mixed condition and at a reasonably high temperature which creates additional problems owing to evaporation of certain ingredients as a result of continuous heating, coagulation and other changes in the appearance, condition and/or consistency of the partially prepared sauce. It happens again and again that the gastronomic establishment (be it a restaurant, a mess or a hotel kitchen) prepares insufficient or excessive quantities of sauces. If the quantity is insufficient, the guests must wait for long periods of time for completion of their orders. The making of excessive quantities of expensive sauces entails problems with storage and, practically invariably, a pronounced reduction of quality.

OBJECTS AND SUMMARY OF THE INVENTION

An object of the invention is to provide a novel and improved method of preparing various sauces or analogous foodstuffs with minimal losses in time and with minimal expenditures for qualified personnel.

Another object of the invention is to provide a method of making butter sauces, batters, salad dressings, cream soups and analogous foodstuffs at a fraction of the cost of such preparations in accordance with heretofore known techniques.

A further object of the invention is to provide a method of making sauces or the like according to which the ingredients of the sauce can be stored, without spoilage and/or reduction of quality, for practically unlimited periods of time.

An additional object of the invention is to provide a method of the above outlined character which renders it possible to rapidly prepare small or large quantities of fancy sauces, dressings, soups, batters or the like without affecting the quality of the preparations and without necessitating the presence of highly qualified and/or trained personnnel.

Still another object of the invention is to provide a method of making fancy sauces or the like, practically without losses in expensive ingredients, in such a way that the final product can be readily seasoned or otherwise prepared to taste of an individual guest or visitor, and tht the quality of the product remains unchanged irrespective of whether successive servings are required one after the other, at regular intervals or at irregular intervals.

A further object of the invention is to provide a novel and improved method of making foamed edible preparations, such as sauce hollandaise or bearnaise, which can be prepared by semiskilled persons or even by helpers without adversely affecting their quality and/or appearance.

Still another object of the invention is to provide a novel and improved apparatus for the practice of the above outlined method.

An additional object of the invention is to provide an apparatus which can be used for the preparation of fancy foamy sauces or like foodstuffs on short notice, in larger or smaller quantities and in a quality which cannot be readily matched even by highly skilled cooks, housewives or chefs.

A further object of the invention is to provide the apparatus with novel and improved means for permitting convenient washing, rinsing and similar treatment of parts which come in contact with the constituents of the preparation.

Another object of the invention is to provide the apparatus with novel and improved means for maintaining the ingredients of the preparation in an optimum condition for immediate conversion into the final product.

A further object of the invention is to provide an apparatus which is sufficiently compact and inexpensive to warrant its utilization not only in relatively large but also in small or very small establishments including restaurant kitchens, hotel kitchens, kitchens of military barracks, private homes, schools, hospitals and like establishments.

An additional object of the invention is to provide the apparatus with novel and improved means for facilitating rapid and accurate adjustment of the foaming and/or homogenizing action upon the ingredients of the ultimate product.

Another object of the invention is to provide a novel and improved mode of preparing the ingredients of fancy butter sauces, salad dressings, cream soups, batters or the like for conversion into the final product and in such a way that the ingredients can be stored for any desired period of time without appreciable changes in appearance, quality and/or consistency.

An ancillary object of the invention is to provide an apparatus of the above outlined character which is sufficiently simple to warrant entrusting its manipulation to semiskilled or even unskilled persons including housewives, maids and helpers in the kitchens of restaurants, hotels, hospitals and like establishments.

One feature of the invention resides in the provision of a method of making salad dressings, creams, sauces, cream soups, batters and other foamy or frothy foodstuffs, especially fancy butter sauces including sauce hollandaise and sauce bearnaise. Such foodstuffs invariably comprise a plurality of selected ingredients including, among others, wine, vinegar, milk, heavy cream, worcestershire sauce, butter, margarine, flour, sugar, salt, pepper and/or other spices, tarragon, beef extract, eggs (especially egg yolks), water, parsely, shallots, chervil, monosodium glutamate and/or others.

The method comprises the steps of mixing two or more ingredients, maintaining the resulting first mixture in a state of readiness (preferably at a given temperature, most preferably at a temperature of less than 50° C.), and admixing air to and homogenizing portions of the first mixture at the rate at which the resulting final mixture is to be served or consumed.

The method can further comprise the steps of refrigerating (preferably deep freezing) the first mixture and defrosting batches of the deep frozen first mixture so as to maintain in a state of readiness a supply of first mixture which suffices for the preparation of portions that are expected to be served or consumed.

The admixture of air and homogenization are preferably carried out in a fully automatic way, i.e., by resorting to motor-driven instrumentalities. The arrangement is such that the first mixture is converted into the final mixture in quantities or portions which correspond exactly to the momentary requirements, i.e., without unnecessary surplus of the finished product which is likely to spoil or go to waste in the absence of consumers.

It is further within the purview of the invention to maintain the temperature of the first mixture at a substantially constant value prior to the homogenizing and air-admixing steps. This facilitates the conversion of first mixture into the final product and enhances the equality of such product, i.e., the taste and appearance of successively formed portions or servings are likely to be uniform.

If the first mixture is to be converted into a fancy butter sauce, such as sauce bearnaise or sauce hollandaise, it is advisable to slightly cool the dissolved or molten butter or margarine, to admix thereto various ingredients (including egg yolks) by stirring, to continue stirring the first mixture while continuing to cool it, preferably on ice, until the mixture is cooled to the desired (relatively low) temperature, and to thereupon refrigerate the mixture. When the person in charge wishes to make a sauce, a batch of the frozen mixture is defrosted and preferably heated to the aforementioned temperature so that it is ready for conversion into the final product (i.e., by mixing it with air and homogenizing) when the need arises and at the rate at which the final product is to be served to one or more guests, members of the family, students, inmates, patients, enlisted persons, workers in a plant or office and/or other groups of consumers.

The rate at which the first mixture will be converted into the ultimate product or mixture depends on the size of the gastronomic enterprise (this term is intended to embrace kitchens of private homes, restaurants, hotels, prisons, hospitals, military barracks, factory mess halls, corporate mess halls, schools, pensions and like establishments).

An important advantage of the improved method is that the first mixture can be stored for any desired periods of time and such mixture is converted, preferably by resorting to automatic apparatus, into the ultimate product at a rate which is desired or needed for immediate consumption. This entails substantial saving in time, reduces losses in valuable ingredients, and renders it possible to prepare fancy sauces or the like by employing unskilled or semiskilled personnnel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a somewhat schematic partly elevational and partly sectional view of an apparatus which embodies one form of the present invention;

FIG. 2 is a partly elevational and partly sectional view of an air admitting valve which can be utilized in the apparatus of FIG. 1;

FIG. 3 is an enlarged transverse sectional view of the homogenizing unit in the apparatus of FIG. 1, substantially as seen in the direction of arrows from the line III—III of FIG. 1; and FIG. 4 is a similar enlarged sectional view as seen in the direction of arrows from the line IV—IV of FIG. 1.

DESCRIPTION OF THE PREFERRED EMBODIMENTS

FIG. 1 illustrates an apparatus 1 which comprises a frame or support 1a, e.g., a frame which can be mounted on wheels for convenient transport in a kitchen to and from the area where food or plates for delivery to workers, patients, students, pupils, inmates, visitors, guests or members of the family are placed. The frame 1a is or may be confined in a housing or shell a portion of which is indicated at 1b. The apparatus 1 is designed for the preparation of fancy salad dressings, batters, sauces, cream soups and like consumable foamy foodstuffs which, as a rule, must be mixed with air and/or homogenized prior to serving and contain a plurality of ingredients. Sauce bearnaise and sauce hollandaise are typical examples of fancy foodstuffs which can be prepared, at a reasonable cost and without losses in valuable ingredients, by resorting to the apparatus of FIG. 1.

The apparatus 1 comprises a conveying means here shown as a suction pump 2 (preferably a piston pump) of any suitable design (preferably a pump whose component parts are made of preferably metallic materials capable of standing elevated temperatures of up to and in excess of 100° C.). The housing of the pump 2 has a first inlet 3 which is connected with a preferably flexible conduit 4 serving to admit a prepared first mixture of various ingredients. Such first mixture is stored in a vessel or reservoir 5 and forms therein a supply which is denoted by the character 12. The vessel 5 is preferably removably supported on a table top like portion 1c of the frame 1a and has a removable lid 5a so as to allow for introduction of fresh quantities of first mixture into its interior. The lower portion of the vessel 5 contains a heater 10, e.g., an electric resistance heater which is immersed into a body 10a of water disposed below and sealed from the supply 12 of first mixture. The temperature of the supply 12 in the vessel 5 is preferably constant, e.g., within a range whose upper limit preferably does not exceed 50° C.

The pump 2 has a second inlet 6 which serves for admission of air from the surrounding atmosphere and is provided with an adjustable valve 8 adapted to regulate the rate of admission of air into the pump housing or to interrupt the admission of air during certain stages of processing of the first mixture which is drawn from the vessel 5. The outlet 2a of the pump is connected with a homogenizing unit 7 which is removably secured to an upright member 1d of the frame 1a and has a food discharging end portion 11 located at a level above a dish 13 which rests on a platform 14 of the frame 1a.

The valve 8 is preferably of the self-closing type. As shown schematically in FIG. 2, this valve may comprise a seat 8a which is normally engaged by a reciprocable valving element 8b under the action of a valve spring 8c. The valving element 8b can be locked in sealing position by a screw or bolt 8d so that the valve then prevents the admission of air when the pump 2 is started to draw the first mixture from the vessel 5 as well as when the apparatus is to be cleaned, e.g., by replacing the vessel 5 with a source of hot, boiling or cold water or another suitable washing or rinsing fluid. The bias of the valve spring 8c is preferably adjustable by moving its retainer 8e through the medium of one or more screws 8f or analogous adjusting elements so that the operator can select the rate of admission of air into the pump 2. The valve housing or body 8g carries a scale 8i which is provided with graduations adjacent to the path of movement of a marker or index 8j on the screw 8f so that the operator can observe the selected bias of the spring 8c and hence the selected rate of admission of air into the pump 2. This enables the person in charge to select, in advance, the percentage of air which is admixed to the first mixture flowing into the pump housing by way of the conduit 4. The locking bolt 8d can be omitted because, when the retainer 8e is moved sufficiently close to the seat 8a, suction in the pump 2 cannot cause the valving element 8b to permit air to flow into the inlet 6.

When the apparatus 1 is to be started, the valve 8 is closed so that the pump 2 draws only a stream of first mixture which enters the pump housing via inlet 3. Once the pump 2 is filled with such mixture, the valve 8 is permitted to open to a desired extent so that the inlet 6 admits air which is thoroughly mixed with the ingredients of the first mixture during passage through the pump housing as well as during subsequent passage through the homogenizing unit 7.

The pump 2 is driven by an electric motor 9 or another suitable prime mover which is installed in the lower portion of the frame 1a. The reference character 10b denotes a portion of an adjustable thermostat of any known design which controls the action of the heater 10 so that the water bath 10a below the supply 12 of intermixed constituents of the first mixture in the vessel 5 is maintained at a selected temperature.

The homogenizing unit 7 is designed to ensure highly predictable, reproducible and thorough intermixing of all ingredients of the ultimate product which is discharged into the dish 13 (e.g., a bowl, plate or the like).

To this end, the homogenizing unit 7 comprises various sections which are located downstream of one another, as considered in the direction of flow of first mixture and air from the outlet 2a toward the dish 13, and change the direction of flow of numerous streamlets of mixture on their way toward the food discharging end 11. As shown in FIG. 3, the homogenizing unit 7 can comprise a first section which includes a plurality of substantially triangular obstructions or projections 7a in the path of flow of first mixture and air toward the discharging end 11. The first mixture and air flow through a group of channels 7b between the neighboring obstructions 7a. The section of FIG. 3 is followed by the section of FIG. 4 (or vice versa) which comprises otherwise configurated (e.g., trapeziform) obstructions or projections 7c which are staggered with reference to the obstructions 7a, as considered in the circumferential direction of the tubular casing or shell 7d of the homogenizing unit 7. This means that each and every streamlet of first mixture and air which had advanced beyond the section of FIG. 3 must change the direction of its movement in order to fill the group of channels or passges 7e between the obstructions 7c of the section shown in FIG. 4. One or more additional sections can be provided upstream of the section of FIG. 3 and/or downstream of the section of FIG. 4, depending on the desired degree of homogenization and on the homogenizing action of the section shown in FIGS. 3 and 4.

The prime mover 9 can be started by a switch 9a on the upright 1d. A box 15 in the frame 1a contains fuses and is connected to a suitable energy source by a cable or cord 16.

The homogenizing unit 7 can be modified in a number of ways without departing from the spirit of the invention. For example, the shell 7d and the obstructions of the unit 7 can define one or more groups of zig-zag shaped channels followed by one or more groups of helical or annular channels and/or vice versa. Obstructions in the form of triangular, trapezoidal or analogous projections in the shell 7d can cooperate to ensure a desirable homogenizing action. All that counts is to ensure that the unit 7 or an analogous unit furnishes a homogenizing action which guarantees the making of a final product that is acceptable even in multi-star restaurants and in like expensive gastronomic establishments specializing in the service of high-quality foods.

As shown in FIG. 1, the food discharging end 11 of the homogenizing unit 7 can be provided with an annulus of additional obstructions or projections in the form of radially inwardly extending triangular prongs or teeth 11a which effect a final homogenizing action before the ultimate product enters the dish 13.

It is further within the purview of the invention to replace the illustrated apparatus 1 with an apparatus which resembles or constitutes a device for the making of whipped cream, i.e., wherein intermixed ingredients are contacted by air to impart to the ultimate product a foamy or fluffy consistency which is appreciated by gourmets and enhances the appearance and/or quality of the salad, entree and/or other order which embodies a portion or serving of the ultimate product or with which the ultimate product is served.

Still further, the apparatus 1 can be modified by replacing the heater 10 with a cooling unit for the contents of the vessel 5, for example, if the ingredients of the supply 12 are mixed directly in the vessel, i.e., if such supply does not constitute a batch of previously frozen first mixture which must be defrosted or melted prior to assuming a consistency which enables it to flow into and through the conduit 4 on its way to the pump 2 and homogenizing unit 7.

The valve 8 can be connected to a source of a gaseous fluid other than air without departing from the spirit of the invention. The term "air" is intended to embrace air as well as any other suitable gas which can be mixed with the first mixture in the pump 2 and/or in the homogenizing unit 7 or an equivalent or analogous homogenizing device.

An adjustable air admitting valve is desirable and advantageous but not critical. Adjustability of the rate of admission of air into the pump 2 is particularly desirable when the apparatus is to be used for the making of different types of creams, sauces, dressings or the like because the rate of admission of air when the apparatus is in the process of making a salad dressing might be different from the rate of air admission during the preparation of a butter sauce or batter.

The apparatus 1 of FIG. 1 or an analogous apparatus renders it possible to prepare a fancy sauce, dressing, soup, cream, batter or the like in several stages and to complete the last stage immediately prior to consumption. Furthermore, and since the step of permeating the mixture with air and the step of homogenizing the mixture need not be performed by hand, the placing of requisite quantities of first mixture into condition for consumption takes up a minimal amount of time. The first mixture (supply 12) can be held in storage (e.g., in a freezer or refrigerator) for any desired period of time, i.e., the interval between the preparation of the first mixture and conversion of such first mixture into a foamy sauce or the like can be as long as desired. As a rule, larger quantities of the first mixture will be stored in a freezer, and the person in charge will remove from the freezer a batch of frozen first mixture when the need arises. The removed batch is allowed to thaw in or prior to introduction into the vessel 5, and is maintained at a desired temperature all the way to evacuation of the last portion of a batch from the vessel 5. The pump 2 is started at desired intervals and for desired periods of time, i.e., the person in charge looks at the quantity of accumulated foamy material in the dish 13 and arrests the motor 9 when the quantity of foamy material in the dish 13 suffices for the selected number of servings.

The preparation of a first mixture which is about to be put into a refrigerator or freezer or directly into the vessel 5 will involve selection of metered quantities (per weight and/or per volume) of certain ingredients. By way of example, if the mixture is to be converted into sauce hollandaise, such mixture can be made of the following ingredients: Ten egg yolks are mixed with 1300 grams of molten butter or margarine, 1/16 liter of water, ⅛ liter of white wine, a level spoon of sugar, the juice of one lemon, a pinch of salt, a pinch of monosodium glutamate and a pinch of powdered onions or shallots. If the person in charge wishes to prepare a first mixture which is to be converted into sauce bearnaise, the aforeenumerated ingredients are used with a prise of ground (preferably freeze dried) pepper, a level spoon of preferably freeze dried parsley, a level spoon of preferably freeze dried tarragon, a dash of Worcestershire sauce and a desired quantity of a suitable beef extract, e.g., Herb-Ox (trademark). It is clear that the above are merely examples since each chef, housewife or another specialist will have her or his own recipe which may include further ingredients or which omits one or more of the above-listed ingredients. The mixture is then stored in a refrigerator or freezer or is admitted directly into the vessel 5. In fact, the vessel 5 can be designed in such a way that it allows for convenient mixing of ingredients which then form a batch or supply capable of yielding a given number of servings. Other butter sauces (the term butter is intended to embrace butter as well as margarine and/or other butter substitutes) can be prepared in an analogous manner, i.e., the person in charge will prepare a first mixture which is then stored, either in the vessel 5 or in a freezer or refrigerator, and is converted into the ultimate product (e.g., a foamy sauce bearnaise or hollandaise) at the rate at which the product is to be served and consumed.

Butter which is to be used for the making of sauce hollandaise, sauce bearnaise or an analogous fancy butter sauce is preferably treated prior to mixing with other ingredients by separating buttermilk (if any) from butter fat and using only butter fat for admixture to other ingredients.

An important advantage of the improved method and apparatus is that they enable the person in charge of a gastronomic establishment to serve fancy creams, sauces, dressings, batters, etc. at a reasonable cost, especially as far as the manual work is concerned, and practically without any losses in valuable but often perishable ingredients. This is attributed to the discovery that the ingredients of the ultimate product can be mixed and stored as long as desired, and that batches of the stored first mixture can be prepared for immediate conversion into ultimate products in quantities which are estimated to satisfy the needs of a restaurant on a given day of the week. The first mixture can be stored in available machines (e.g., freezers or refrigerators) for long periods of time and without affecting its appearance, consistency and/or teast. The amount of time and work involved to convert a desired quantity of first mixture into a fluffy sauce is surprisingly short, especially if the admixture of air and homogenization are carried out by resorting to motor-driven units.

Another important advantage of the improved method and apparatus is that a chef, cook or housewife who did not participate in the preparation of the frist mixture can readily influence the taste of the ultimate product by removing a batch of frozen or deep frozen mixture from storage, by causing the removed batch to melt, and by thereupon seasoning or otherwise influencing the mixture to taste (e.g., by adding further spices, by adding larger quantities of salt, by adding additional dashes of extract, Worcestershire sauce or the like) so that the taste and appearance of the ultimate product will reflect the preference of the person who is in charge of preparing servings of sauce, cream, dressing, batter, soup or the like. In other word, the first mixture which is to be frozen can be mass produced by a food processing chain and distributed to supermarkets for purchase by smaller restaurants, housewives, hotels and/or others, but the purchaser of such mass-produced first mixture can thereupon influence the taste and/or appearance of the ultimate product to his or her liking. Thus, the person in charge of serving the food is in a position to influence the quality and/or appearance of a butter sauce or the like to the same extent as if the sauce were made entirely by such person, i.e., from scratch. Moreover, the apparatus which is shown in FIG. 1 or an analogous apparatus renders it possible to furnish a requisite number of servings of a fancy sauce, soup, dressing or the like irrespective of the time of the day or the number of persons to be served, i.e., a restaurant which is equipped with such an apparatus can serve a large number of meals or a relatively small number of meals, and the waiting time for service is not prolonged solely because several persons have ordered salads, entrees or soups which must be prepared by mixing a previously prepared (first) mixture of solid and liquid ingredients with air and by simultaneously or thereafter homogenizing the product. There is no need to have an extra employee who would service the apparatus because the personnel in charge of other tasks can start or stop the apparatus whenever necessary. The apparatus reduces the likelihood of spoilage of the first mixture even though such mixture is always ready for conversion into a fancy sauce or the like.

If the gastronomic enterprise which utilizes the improved apparatus is sufficiently large, it can be equipped with additional apparatus or devices which render it possible to prepare large quantities or batches of first mixture which is held in storage until the time for conversion into sauces, soups, dressings, batters or the like has arrived. The batches are held in storage until shortly before actual use, i.e., a batch will be removed before the establishment opens for business and the contents of such batch are defrosted or allowed to thaw so as to permit for convenient evacuation by way of the pump 2 or an analogous pump. The provision of power-operated means for admixing air to the first mixture and for homogenizing renders it possible to satisfy any practical number of customers without excessive waiting time; in fact, the time which is needed to serve a guest who has ordered a dish with sauce bearnaise, sauce hollandaise or a like sauce which can be prepared in accordance with the method and by resorting to the apparatus of the present invention need not be extended at all since, and as mentioned above, the interval which elapses during preparation of a portion of serving of cream or sauce is so short that it does not influence the interval which is needed to prepare the remaining constituents of a salad, entree or dessert.

Replacement of the apparatus 1 with an apparatus which is available in a modern or reasonably modern kitchen is desirable and advantageous in relatively small establishments which cannot readily afford an additional apparatus or where the space is at a premium. For example, an apparatus which is used to make whipped cream can be used to mix a first mixture with air and to homogenize the product so as to form a foamy cream, sauce, soup, dressing, batter or the like. Many conventional apparatus for the making of whipped cream are equipped with a cooled receptacle for heavy cream. Such receptacle can be replaced with the vessel 5 of FIG. 1 so a to allow for defrosting of batches of the first mixture preparatory to mixing with air and homogenizing. In other words, all that is necessary to convert a conventional apparatus for the making of whipped cream for the practice of our method is to equip such conventional apparatus with a vessel which is capable of defrosting a batch of first mixture. The defrosted first mixture is then contacted by air and homogenized to be thereby converted into a fancy sauce or the like at a fraction of the cost and time which is needed to produce such sauces in accordance with heretofore known practices. Moreover, the quality of the sauce is not inferior to that of a sauce that has been prepared from scratch.

The apparatus 1 can be readily cleaned by replacing the vessel 5 with a source of washing or rinsing fluid which is drawn by the pump 2 via conduit 4 so as to clean the homogenizing unit 7 as well as the pump preparatory to a reasonably long interval of non-use. FIG. 1 shows, by phantom lines, the outline of a container which can be placed onto the table 1c in lieu of the vessel 5 and serves as a means for storing a body of cool, hot or warm water, a body of another cleaning or rinsing liquid, or a body of water which contains one or more detergents serving to effect more rapid and more reliable removal of all remnants of the ingredients of a first mixture from the conduit 4, the pump 2 and homogenizing unit 7. The apparatus 1 can be cleaned to prevent a gathering of insects or vermin in or on its components, preparatory to transfer to storage or to another locale of use, or if one and the same apparatus is to be used for the making of two or more different fancy sauces or the like. The aforementioned container can be equipped with a built-in heater to allow for rapid heating of water or another cleaning liquid to a desired temperature. In fact, the vessel 5 can be used in lieu of the container since the vessel 5 already embodies a heater 10 which, if properly designed, can readily heat water (10a) to a temperature which suffices to effect rapid and thorough washing and rinsing of the parts 4, 2 and 7. If the heater 10 of FIG. 1 is used for indirectly heating a supply 12 of prepared mixture by way of a body (10a) of water or another liquid, such liquid can be used for cleaning of the conduit 4, pipe 2 and homogenizing unit 7, either in a condition as is or after further heating to an elevated temperature. If the person in charge merely wishes to rinse the parts 4, 2 and 7, the inlet of the conduit 4 can be connected to a faucet for cold or hot water. Alternatively, the vessel 5 can be used as a source of hot water and the conduit 4 will be connected to a source of cold water for rinsing after completion of the main washing or cleaning operation.

Since a thorough washing and rinsing normally or often involves the use of water or another liquid at elevated temperature, the material of the conduit 4, the material of those parts of the pump 2 which come in contact with the hot or boiling liquid, as well as the material of those parts of the homogenizing unit 7 which come in contact with such liquid during washing and/or rinsing is selected with a view to stand the maximum prevailing temperatures, e.g., temperatures in the range of 100° C. or even higher. This ensures that the parts 4, 2 and 7 can be washed and/or rinsed with boiling water.

If the liquid which is to be used for washing or rinsing of the parts 4, 2 and 7 contains one or more suitable detergents, the cleaning and rinsing action can be so thorough that it actually amounts to sterilizing of the apparatus. All that is necessary is to admit to the hot liquid a suitable disinfectant before the motor 9 is started while the valve 8 is closed so that the pump 2 draws disinfectant-containing hot liquid from the vessel 5 or the container, through the conduit 4 and through the interior of the pump housing, and thereupon forces such liquid to flow through the homogenizing unit 7. It has been found that the apparatus can be readily operated to remove any and all traces of ingredients of the first mixture from the parts 4, 2 and 7 within a reasonably short interval of time so that the apparatus is then ready for the placing in storage or for the making of a different fancy foodstuff.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of producing a sauce comprising the steps of:
   (a) mixing a plurality of ingredients including butter and/or a butter substitute and egg yolk to form a semifinished sauce in substantially non-foamy condition;
   (b) storing said semifinished sauce without substantial spoilage thereof; and
   (c) admitting a gas into and homogenizing said semifinished sauce subsequent to the storage step to convert said semifinished sauce into a foamy sauce for consumption.

2. The method of claim 1, wherein said ingredients further include wine and/or a spice.

3. The method of claim 1, further comprising the step of melting said butter and/or said butter substitute; and wherein the mixing step is performed with the melted butter and/or the melted butter substitute.

4. The method of claim 1, further comprising the step of clarifying said butter and/or said butter substitute; and wherein the mixing step is performed with the clarified butter and/or the clarified butter substitute.

5. The method of claim 4, wherein the clarifying step comprises heating said butter and/or said butter substitute; and further comprising the step of cooling said clarified butter and/or said clarified butter substitute prior to the mixing step.

6. The method of claim 1, further comprising the step of cooling said semifinished sauce during the mixing step.

7. The method of claim 1, wherein the storing step comprises freezing said semifinished sauce; and further comprising the step of thawing said semifinished sauce prior to the admitting and homogenizing steps.

8. The method of claim 1, wherein said butter substitute comprises margarine.

9. The method of claim 1, wherein said gas comprises air.

10. The method of claim 1, wherein the mixing step comprises stirring said ingredients.

11. The method of claim 1, further comprising the step of heating said semifinished sauce subsequent to the storing step and prior to the admitting and homogenizing steps.

12. The method of claim 11, wherein the heating step comprises maintaining said unfinished sauce in flowable condition at a substantially constant temperature.

13. The method of claim 12, wherein said temperature is less than about 50° C.

14. The method of claim 1, wherein the admitting and homogenizing steps are performed at a rate approximating that at which said foamy sauce is consumed.

15. A method of producing a sauce comprising the steps of:
   (a) melting and clarifying butter and/or margarine;
   (b) cooling the clarified butter and/or margarine while maintaining the same in flowable condition;
   (c) combining the cooled but flowable clarified butter and/or margarine with a plurality of ingredients including egg yolk, wine and a spice;
   (d) mixing the resulting mixture while cooling the same to form a semifinished sauce in substantially non-foamy condition;
   (e) freezing said semifinished sauce after the mixing step;
   (f) thawing said semifinished sauce; and
   (g) admitting air into and homogenizing said semifinished sauce subsequent to the thawing step to convert said semifinished sauce into a foamy sauce for consumption.

16. The method of claim 15, further comprising the step of maintaining said semifinished sauce in flowable condition at a substantially constant temperature between the thawing step and the admitting and homogenizing steps.

17. The method of claim 16, wherein said temperature is less than about 50° C.

* * * * *